Oct. 14, 1969 L. O. CURRY 3,473,028
X-RAY TUBE HOUSING CONSISTING OF A DIELECTRIC MATERIAL
WITH AN ELECTRICALLY CONDUCTIVE LINER
Filed Sept. 26, 1966 2 Sheets-Sheet 1

INVENTOR.
LEONARD O. CURRY
BY
Fishburn and Gold
ATTORNEYS

Oct. 14, 1969 L. O. CURRY 3,473,028

X-RAY TUBE HOUSING CONSISTING OF A DIELECTRIC MATERIAL WITH AN ELECTRICALLY CONDUCTIVE LINER

Filed Sept. 26, 1966 2 Sheets-Sheet 2

INVENTOR.
LEONARD O. CURRY

BY Fishburn & Gold

ATTORNEYS

United States Patent Office 3,473,028
Patented Oct. 14, 1969

3,473,028

X-RAY TUBE HOUSING CONSISTING OF A DIELECTRIC MATERIAL WITH AN ELECTRICALLY CONDUCTIVE LINER

Leonard O. Curry, Nevada, Mo. 64772

Filed Sept. 26, 1966, Ser. No. 581,913
Int. Cl. H01j 7/44
U.S. Cl. 250—87 3 Claims

ABSTRACT OF THE DISCLOSURE

A relatively small radiographic examination apparatus includes a housing having walls of a dielectric material, an electrically conducting liner secured to the interior surface of the housing walls and inflow and outflow means communicating with the interior chamber of the housing permitting the free circulation of an insulating, dielectric medium to and from said chamber.

The present invention relates to the field of radiographic examination and, more particularly, to an apparatus for the radiographic inspection of the quality of welds and the like.

In the art of radiographic examination, considerable difficulty has been experienced in the field utilization of radiographic inspection equipment particularly along pipe lines and in pumping stations and the like where mobility and maneuverability of the equipment is essential. In order to provide radiographic equipment, such as X-ray devices, of sufficient power to inspect pipe welds and the like, it is necessary to employ extremely large, heavy and cumbersome housings to enclose the equipment having adequate cooling systems to effect a transfer of heat from the equipment. The prior art equipment normally weighs approximately 170 pounds, and is quite bulky. The handling of equipment of this nature is further complicated by the heat generated by the equipment which causes the equipment housing to heat to levels where handling by personnel is difficult.

In view of the high power requirements of equipment of this nature, there is a danger of arc-over to the housing or through the housing to exterior objects and this danger is materially increased as the temperature of the equipment housing and the insulation medium within the housing rises. The problem of arc-over is extremely acute in areas along certain pipe lines and the like where quantities of volatile material may accumulate and explosions could result. Even where explosion is not a possibility, an arc-over will result in the loss of transformers causing a termination of the operation and expensive repairs. In view of this danger, prior art equipment is normally operated on 30 minute duty cycles with down time for cooling and on hot days where hot welds are encountered the duty cycle may be reduced to as low as 2½ to 5 minutes. The inability of such equipment to be operated safely in a continuous manner or with long duty cycles seriously hampers inspection operations.

The principal objects of this invention are: to alleviate the aforementioned difficulties in the art by providing a radiographic examination apparatus which is relatively small, light and easily handled and maneuvered and may easily be employed in field type environments; to provide such a unit which may be utilized under normal temperature conditions without concern for duty cycles, while maintaining acceptably safe operating conditions without danger of arc-over to or through the equipment housing; to provide such an apparatus having a new and novel housing construction wherein the danger of arc-over is substantially eliminated while providing an overall portable radiographic examination unit several times less in weight than present day units and smaller in size to permit ease of mobility and maneuverability; to provide such an apparatus which may be operated continuously under normal temperature conditions without the necessity of a secondary cooling system other than the heat transfer effected by the circulation of an insulating medium to and from the interior chamber of the equipment housing and through a heat exchanger means; to provide such an apparatus which may be operated continuously under extreme temperature conditions such as hot days on hot welds with the employment of conventional secondary cooling systems to remove heat from the insulating medium; to provide such an apparatus having a bipartite housing which may be opened and resealed under field conditions to replace defective equipment thereby eliminating the necessity of factory repair which is normally attendant to prior art apparatus of this nature; to provide such an apparatus having a housing constructed of such a shape and having an X-ray tube so located within said housing as to facilitate the utilization of the apparatus in extremely close quarters even for inspection of welds on pipe risers where previous inspection was difficult if not impossible, due to the structure arrangement of the prior art devices; to provide such an apparatus which may be manufactured at approximately one-half of the cost of the typical prior art units and which will materially increase the efficiency of inspection operations.

Other objects and advantages of this invention will become apparent from the following description taken in connection with the accompanying drawings wherein are set forth, by way of illustration and example, certain embodiments of this invention.

FIG. 4 is a fragmentary transverse vertical sectional view taken on line 4—4 of FIG. 3 showing an end elevational view of the X-ray tube mounting to the housing of the inspection apparatus.

Figures 1, 2:
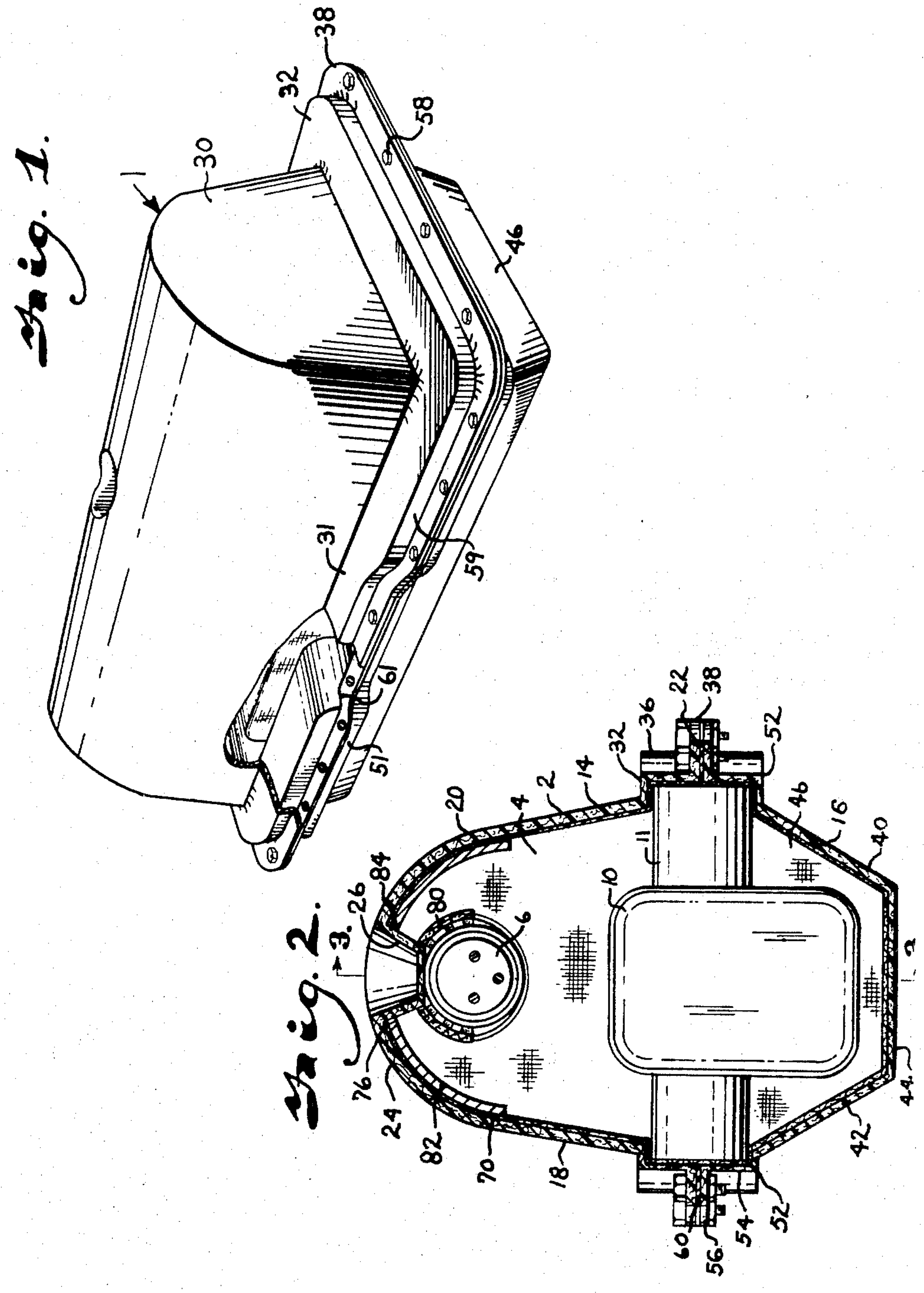
FIG. 1 is a perspective view of a radiographic inspection apparatus embodying the features of this invention.
FIG. 2 is a vertical sectional view taken on line 2—2 of FIG. 3 through the housing of the radiographic inspection apparatus showing the disposition of the transformer and X-ray tube in the interior chamber of said housing.

Referring to the drawings in more detail,

The reference numeral 1 designates a radiographic examination apparatus illustrated herein as an X-ray emission device for the direction of X-rays through pipe welds and the like for the exposure of photographic film to reveal defects in said welds. The apparatus 1 is broadly comprised of a housing 2 defining an interior chamber or compartment 4, a radiation emission means illustrated as an X-ray tube 6 and power means, particularly a pair of electrical transformers 8 and 10.

The X-ray tube 6 may be of any suitable size and type dependent upon the particular utilization of the examination apparatus 1. For example, an industrial X-ray tube such as the Eureka SPH-B, 160 kvp. hooded anode type X-ray tube may be suitably employed for the radiographic inspection of welds in pipe lines and pipe station installations. The transformers 8 and 10 may be of a conventional type with cores 9 and 11 respectively having the tube 6 operatively coupled thereto by a center grounded, self-rectified or halfwave circuit, for provision of high voltage to the X-ray tube 6.

The housing 2 which defines the interior chamber 4, as illustrated, is bipartite. The housing 2 is comprised of a first or upper housing portion 14 and a second or lower housing portion 16 with said portions being releasably contained in cooperative relation to form a sealed inner compartment 4.

The first housing portion 14 includes side walls 18 and 20, said side walls 18 and 20 being integrally formed in a channel shaped, trough-like structure, said walls being inclined inwardly from their outer extremity 22 to a central apex portion 24 to thereby define a housing portion having a genrally U-shaped configuration in transverse sectional view as shown in FIG. 2. The first housing portion 14 thereby defines an upwardly tapering, inverted trough-like interior chamber with the X-ray tube 6 operatively mounted at the upper portion of said tapering chamber adjacent said apex portion 24 and, as illustrated, in a centrally located position. The upper housing portion 14 includes a recessed portion having walls defining an inwardly protruding boss-like member 26 to form an X-ray emission window through which the X-ray tube 6 emits radiation.

The side walls 18 and 20 terminate at their opposed end portions in engagement with the end walls 28 and 30, which in the illustrated embodiment are integrally cast with the overall housing structure forming the upper housing portion 14. The side walls 18 and 20 and the end walls 28 and 30 terminate at their outer extremity 22 or free edge portion in a transformer core retaining structure 31 which cooperates with a similar structure on the second housing portion 16 to retain the transformers 8 and 10 in the desired position in the housing 2.

The retaining structure 31 includes an outwardly directed flange 32 which extends circumferentially about the outer edge 22 of said walls 18, 20, 28, and 30 for disposition in overlying generally contacting relation to the cores 9 and 11 of the respective transformers 8 and 10. The structure 31 also includes a circumferentially extending, secondary wall member 36 which is located outside and about the cores 9 and 11. A circumferentially extending sealing flange 38, which is employed for releasably retaining the upper and lower portions 14 and 16 of the housing 2 is sealed relation, is integrally cast with said housing portion 14 and extends outwardly from the wall member 36.

The lower portion 16 of the housing 2 is similarly formed to the upper portion 14 with the inclusion of a flat bottom to allow the disposition of the housing 2 in an upstanding position when placed on a supporting surface. The lower or second portion 16 of the housing 2 includes a pair of opposed outwardly and upwardly inclined side walls 40 and 42 each being integrally cast with a flat, bottom wall or panel 44 with each of said walls 40, 42, and 44 terminating at their opposed end portions and integral with a pair of opopsed end walls 46 and 48. The upper circumferential edge 50 of the side walls 40 and 42 and the end walls 46 and 48 has a transformer core retaining structure 51 including an outwardly protruding lip, ledge or flange portion 52 for underlying, supporting relation to the edge of the transformer cores 9 and 11 and a wall portion 54. The wall portion 54 extends circumferentially about the housing portion 16 and upwardly from the outer edge of said circumferential lip 52 terminating at its upper edge portion in a circumferentially extending, outwardly directed, sealing flange 56 operable for cooperative engagement by a plurality of nut and bolt assemblies 58 for releasably retaining the sealing flanges 38 and 56 in sealing relation to maintain a sealed interior chamber within the housing 2. A gasket material 60 is disposed between the opposed sealing flanges 38 and 56 to effectively seal the housing 2.

The core retaining structures 31 and 51 of the opposed housing portions 14 and 16 cooperate upon disposition of the housing portions 14 and 16 is assembled relation to form opposed recessed portions 59 to retain the transformers 8 and 10 within a desired position within the housing 2 by clamping the core irons 9 and 11 between the opposed flanges 32 and 52. As illustrated, the structures 31 and 51 are reduced in width in the central portion of the housing 2 to form spaced abutment surfaces 61 on opposed sides of housing 2 to retain the transformer 8 and 10 in spaced relation. In this manner the core irons 9 and 11 are located in contacting relation to the housing walls whereby heat may be transferred through said housing 2 from said cores 9 and 11 reducing the heat load transferred to the dielectric insulating medium within the housing 2. As the housing portions are separable along a line intersecting said recessed portions, the transformers 8 and 10 may be removed from the housing upon separation of the housing portions 14 and 16.

As portable X-ray devices of the nature of that illustrated herein contain a dielectric liquid or gas which circulates about the X-ray tube 6 and the transformers 8 and 10, an expander 62 is located in the lower or second housing portion 16. The expander 62 is illustrated as a bellows shaped member which is operable to vary the volume of the inner chamber 4 to accommodate expansion of a heated oil or gas within the chamber 4. The oil or gas is supplied through a pair of tubes 64 operatively connected to a plate 66 which overlies a through aperture 68 defined in the end wall 28 of the first or upper portion 14 of the housing 2. The tubes 64 provide ingress and egress of the insulating fluid or gas to and from the interior chamber 4. The insulating fluid will pass through a heat exchanger means, not shown, to effect a transfer of heat before recirculation through the chamber 4.

The first and second portions 14 and 16 of the housing 2 are each cast of a reinforced synthetic resin material having suitable resistance to heat with good dielectric qualities to thereby inhibit the potential of arc-over or through the housing 2. It is also important to employ such a material which will form a relatively light, durable, heat resistant housing for ease of handling. Various synthetic resins such as the polyester resins with reinforcement may be employed, as for instance, the isophthalic polyester resin manufactured by Cook Paint and Varnish Company (Kansas City, Missouri) No. 939 X–308 having a fiber glass matting such as the ABM matting manufactured by Pittsburgh Plate Glass Company (Pittsburgh, Pennsylvania).

The opposed housing portions 14 and 16, as illustrated, have an inner liner of wire fabric coextensive with the inner wall structure of said portions 14 and 16 with said wire fabric being operatively connected or coupled to ground as a safety factor to prevent the possibility of an arc through to the exterior of the housing 2 possibly resulting in explosion or the creation of other dangerous conditions. The wire fabric liner 70 is comprised of a copper wire screen suitably embedded in a synthetic resin material which may be adhered by suitable resin to the interior surface of the upper and lower housing portions 14 and 16 respectively.

In the illustrated embodiment the X-ray tube 6 is operatively mounted in the upper portion of the first housing portion 14 adjacent the radiation emission window 26 by means of a bakelite retainer 72 which is adhesively secured at 74 to the window structure 26 having an aperture 76 defined through said bakelite retainer 72 such that the tube 6 may be laid or positioned directly against the window structure 26 without interference from the bakelite retainer 72. A cord 78 or other suitable securing means is employed circumferentially about the X-ray tube 6 in a retaining relation to hold the X-ray tube 6 against a plurality of radially disposed spacers 80 formed of cork to thereby permit the free flow of insulating oil or gas about the X-ray tube 6 to assist in transferring heat from the X-ray tube 6. A lead shield 82 is disposed interiorly of the upper center apex portion 24 of the first portion 14 of the housing 2 to prevent the scattering of radiation from the X-ray tube 6. The lead shield 82 defines a centrally located aperture 84 through which the inwardly directed boss of the window structure 26 extends such that the shield 82 effectively defines the flow path of the X-ray emission from the tube 6. The shield 82 may be suitably secured to the side walls 18 and 20, of the upper portion 14 as by adhesive or other means.

Figures 1, 3, 5, 6:
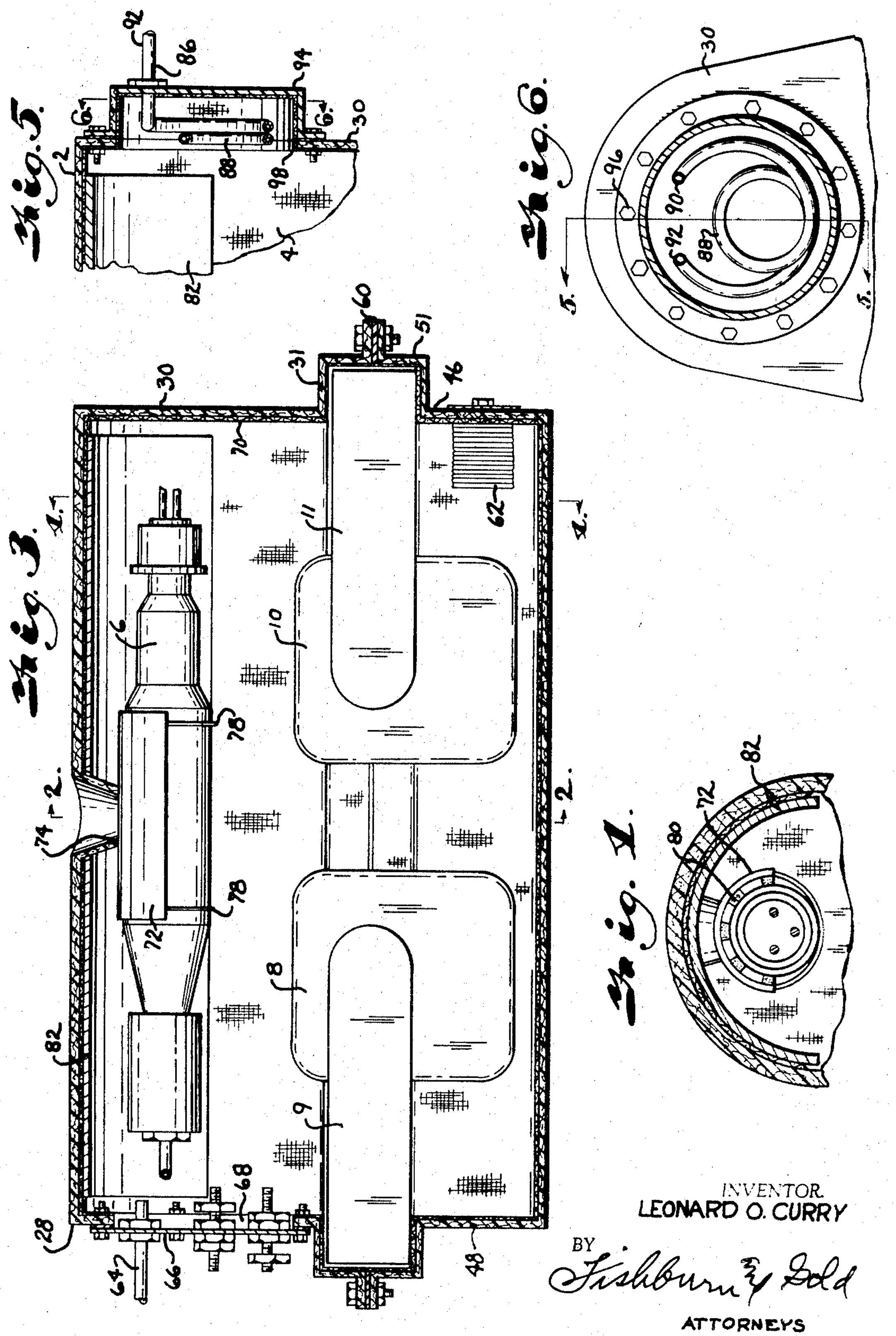
FIG. 3 is a vertical, longitudinal, sectional view taken on line 3—3 of FIG. 2 through the housing of the radiographic inspection apparatus showing the disposition of a pair of transformers and the X-ray tube within the interior chamber of said housing.
FIG. 5 is a fragmentary, longitudinal, vertical, sectional view of a modified form of the inspection apparatus as shown in FIG. 1 having a cooling system comprised of a cooling coil mounted in communication with the interior chamber of said housing for effectively transferring heat from the insulating medium within said housing.
FIG. 6 is a fragmentary, transverse, vertical, sectional view taken on line 6—6 of FIG. 5 showing the cooling coil.

Referring to FIGS. 5 and 6, a cooling system indicated by the numeral 86 is employed in communication with the interior chamber 4 of the housing 2 to effectively transfer heat from the chamber 4 to maintain the X-ray tube 6 at the proper temperature level and to prevent the arc-over of the high voltage transformers 8 and 10 due to a decrease in the insulating qualities of the insulating oil within the chamber 4 upon heating of said oil. The cooling system, as illustrated, is comprised of a cooling coil 88 having an inlet tube 90 and an outlet tube 92 for the passage therethrough of a coolant and is housed in a protruding cap-like structure 94 which is operatively mounted in a suitable manner as by plurality of nuts and bolt assemblies 96 to the end wall 30 about an aperture 98 defined in the end wall 30 to provide communication between the interior chamber 4 of the housing 2 and the cup-like structure 94 housing the cooling coil 88.

As a result of this new and novel housing structure embodying the features of this invention, X-ray apparatus may be utilized in a continuous manner without periods of shutdown to allow for equipment cooling. This new and novel housing also results in the capability of employing such X-ray equipment in a continuous manner without the requirement of separate cooling systems in addition to the heat transfer system employed in the circulation of an insulating medium such as a dielectric oil or a gas throughout the interior of the housing under normal temperature conditions. Further, even under abnormal conditions, the X-ray equipment may be operated continuously with a secondary cooling system to effect a continuous inspection operation under acceptably safe standards. The novel housing allows for the construction of an apparatus 1 weighing approximately 70 pounds and smaller in size than prior art apparatus of this nature.

It is to be understood that while I have illustrated and described one form of my invention it is not to be limited to the specific form or arrangement of parts therein described and shown except insofar as such limitations are included in the claims.

What I claim and desire to secure by Letters Patent is:

1. A radiographic examination apparatus comprising:

(a) an enclosed housing defining an interior chamber, said housing having walls comprised of a dielectric material and including a radiation shield means defining an opening therein to form a radiation emission window from said housing, (b) a radiation emission means for the exposure of photographic film including mounting means connected to said housing for retaining said emission means in a desired relative position within the chamber of said housing, for direction of radiation through said emission window, (c) electrical transformer means operatively coupled to said radiation emission means and including means on said housing for retaining said transformer means in a desired position within said chamber, and (d) an electrically conducting liner substantially coextensive with the interior of the housing.

2. A radiographic examination apparatus as recited in claim 1 wherein said liner is comprised of an electrically conducting screen fabric embedded within a layer of synthetic resin and said synthetic resin is adhesively secured to the interior surface of said housing.

3. The apparatus as recited in claim 2 wherein said electrically conducting screen comprises copper wire.

References Cited

UNITED STATES PATENTS

| | | | |
|---|---|---|---|
| 2,332,427 | 10/1943 | Atlee et al. | 250—89 |
| 2,611,095 | 9/1952 | Goldfield et al. | 250—87 |
| 2,513,915 | 7/1950 | Caldwell | 250—87 |

OTHER REFERENCES

"Electronics," October 1956, pp. 188 to 191, 313–312.

RALPH G. NILSON, Primary Examiner

A. L. BIRCH, Assistant Examiner

U.S. Cl. X.R.

250—89, 90; 313—55, 58, 312